United States Patent [19]
Yoshikawa

[11] Patent Number: 4,601,437
[45] Date of Patent: Jul. 22, 1986

[54] SPINNING REEL

[75] Inventor: Osamu Yoshikawa, Sakai, Japan

[73] Assignee: Shimano Industrial Company Limited, Osaka, Japan

[21] Appl. No.: 631,757

[22] Filed: Jul. 17, 1984

[30] Foreign Application Priority Data

Jul. 21, 1983 [JP] Japan ................. 58-133800
Jul. 29, 1983 [JP] Japan ............. 58-119590[U]

[51] Int. Cl.[4] ............... A01K 89/01; A01K 89/02
[52] U.S. Cl. ................. 242/84.5 A; 242/84.5 R
[58] Field of Search .......... 242/84.1 R, 84.21 R, 242/84.5 R, 84.5 A, 84.5 P, 84.51 A, 84.51 R, 84.53

[56] References Cited

U.S. PATENT DOCUMENTS

| | | | |
|---|---|---|---|
| 2,478,111 | 8/1949 | Kilian | 242/84.51 R |
| 2,548,073 | 4/1951 | Siegrist | 242/84.21 R |
| 4,466,580 | 8/1984 | Toda | 242/84.5 P |

Primary Examiner—Billy S. Taylor
Attorney, Agent, or Firm—Stevens, Davis, Miller & Mosher

[57] ABSTRACT

A spinning reel including a spool for winding thereon a fishing line through rotation of a rotary frame carrying a bail arm is rotable with respect to a reel body with the rotation of the spool being adapted to be subjected to a resistance. Between the spool and a member subject to rotational resistance is provided a shock absorber which deflects when subjected to a pulling action overcoming the durability of the line and absorbs a shock caused by an excessive pulling action on the line, thereby preventing the line from being cut during such excessive pulling thereon.

6 Claims, 4 Drawing Figures

SPINNING REEL

FIELD OF THE INVENTION

This invention relates to a spinning reel, and more particularly to a spinning reel which is adapted to wind a fishing line onto a spool by operating a handle to rotate a rotary frame supported rotatably to a reel body, the spool being rotatable relative thereto, and which includes a resistance means for applying a resistance against the rotation of the spool to interrupt free rotation thereof.

BACKGROUND OF THE INVENTION

Generally, spinning reels use a drag mechanism to prevent a cut at the fishing line which is subjected to a greater load by a hooked fish when the rotary frame is rotated to wind up the line to the spool.

The drag mechanism is interposed between the spool, which is supported rotatably to a spool shaft which in turn is supported not-rotatably to the reel body, and the spool shaft, or between the spool shaft fixing the spool and supported rotatably to the reel body and the reel body, so that a drag thumb nut is operated to apply a desired rotational resistance to the spool.

The rotational resistance from the drag mechanism is adjustable by the drag thumb nut to meet durability of the line, but may overcome durability of the line by mistake or by choice of an angler.

There is a spinning reel provided with a lock mechanism besides the drag mechanism so that the spool is fixed not-rotatably with respect to the reel body.

Hence, in a case where a hooked fish abruptly pulls the line, the line may abruptly be subjected to an excessive load overcoming the durability of the line to lead to a cut thereof.

SUMMARY OF THE INVENTION

An object of the invention is to provide a spinning reel enabling modification of an excessive pulling force acting on the line even when the resistance means composed mainly of the drag mechanism applies to the spool a rotational resistance overcoming the durability of the line, thereby preventing the line from being carelessly cut.

This invention is characterized in that the spinning reel, which supports the spool rotatably with respect to the reel body and has a resistance means for applying rotational resistance to the spool so as to enable interruption of rotation thereof, includes a shock absorber located between the spool or a member rotatable together therewith and a member given the rotational resistance by the resistance means. The shock absorber deflects when the line is subjected to an excessive pulling force overcoming the durability of the line in the state where the spool is given an excessive rotational resistance overcoming the durability of the line, and absorbs the shock caused by the excessive pulling force applied to the line.

The spool is supported rotatably with respect to the reel body in such a manner that the spool shaft carrying the spool is supported rotatably to the reel body and the resistance means is interposed between the spool shaft and the reel body to thereby apply to the spool shaft the rotational resistance. Alternatively the spool shaft rotatably carrying the spool is supported not-rotatably to the reel body and the resistance means is interposed between the spool and the spool shaft, thereby applying the rotational resistance to the spool.

The shock absorber mainly comprises a coiled spring and may be interposed between the spool shaft and the spool supported rotatably thereto in a case where the spool shaft is supported rotatably to the reel body and is subjected to the rotational resistance by the resistance means. Alternatively, the shock absorber may be interposed between the spool shaft fixedly supporting the spool and a member (for example, a drag washer) for giving to the spool shaft a rotational resistance. Also, in a case where the spool shaft rotatably supporting the spool is supported not-rotatably with respect to the reel body, the shock absorber is interposed between the spool and the member (for example, the drag washer) to be given the rotational resistance by the resistance means.

Generally, in the condition where the resistance means sets to the spool a rotational resistance in excess of the durability of the line to be wound onto the spool, the line, when subjected abruptly to an excessive pulling force overcoming the line's durability, may be cut. However, the present invention, even when a larger rotational resistance is set and an excessive pulling force acts on the line, makes less an impact of the pulling force thanks to the shock absorber, thereby enabling the prevention of a cut at the line.

The present invention is further characterized in that the shock absorber is selective of its desired operation during use.

In detail, between the members between which the shock absorber is interposed, that is, between the spool or a member rotatable together therewith and a member subjected to resistance by the resistance means, is provided a connecting or disconnecting means for connecting or disconnecting these members.

Thus, the shock absorber can be selected corresponding to a choice or skill of an angler, which will increase his enjoyment in fishing.

These and other objects and features of the invention will become more apparent upon a reading of the following detailed description and drawings:

DETAILED DESCRIPTION OF THE INVENTION

Figure 1:
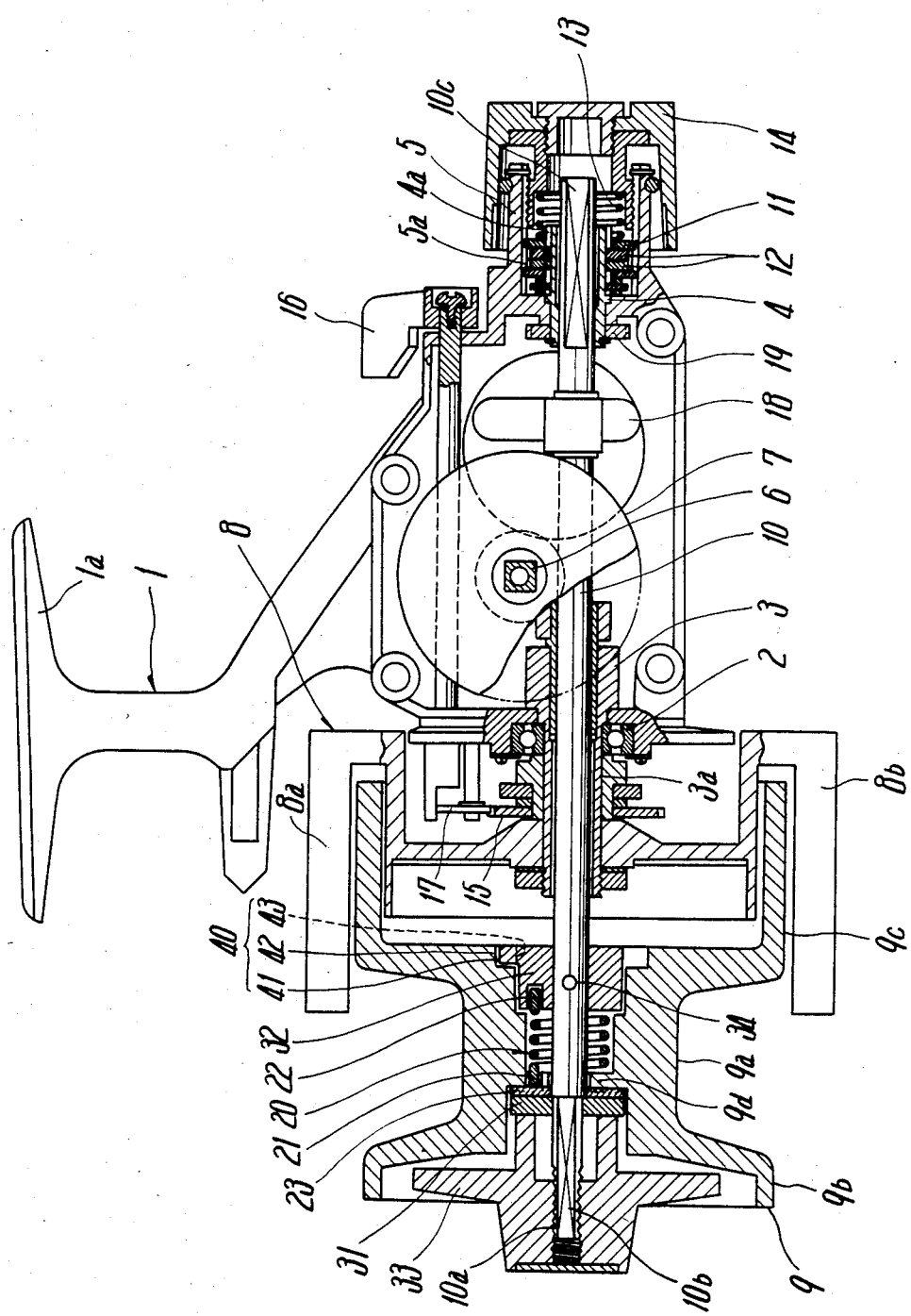
FIG. 1 is a sectional front view of a first embodiment of a spinning reel of the invention.
Figure 2:
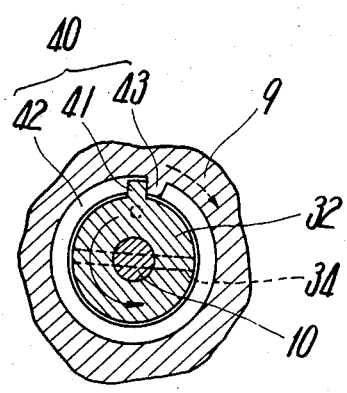
FIG. 2 is a partially sectional side view of the first embodiment.

Referring to FIGS. 1 and 2, the spinning reel is provided with a drag mechanism as the resistance means, and the mechanism is provided at the rear side of a reel body 1 to be of the so-called rear drag type.

The reel body 1 is box-like-shaped and is provided at the upper wall with a mounting leg 1a for a fishing rod; at the front wall with a through bore, through which a pinion 3 having a tubular portion 3a is rotatably supported; at the rear wall with a through bore, through which a tubular shaft 4 having at the outer periphery grooves 4a extending axially of the shaft 4 and a not-round center bore, is rotatably supported; and at the rear side of rear wall with a support cylinder 5.

A handle shaft 6 having a handle (not shown) is supported rotatably to the side wall of reel body 1, and a master gear 7 in mesh with the pinion 3 is fixed at the end of handle shaft 6.

The tubular portion 3a of pinion 3 perforates the front wall of reel body 1 to project forwardly, and a rotary frame 8 is fixed to the outer periphery of the projection and adapted to rotate by the pinion 3 driven by the handle shaft 6.

The rotary frame 8 provides a pair of support arms 8a and 8b, and a bail arm (not shown) having an arm roller is supported across the support arms 8a and 8b in relation of being turnable between a line releasing position and a line winding position, so that the line guided by the arm roller is wound onto the spool 9 through the rotation of rotary frame 8.

The spool 9 comprises a trunk 9a and a pair of flanges 9b and 9c and is supported rotatably to a spool shaft 10 extending longitudinally of the reel body 1, perforating or passing through the front and rear walls thereof, and supported between the pinion 3 and the support cylinder 5.

The spool shaft 10 is provided at the axial front portion with a screw thread 10a and a portion 10b not-round in section and at the rear portion with a portion 10c not-round in section to be fitted into a not-round center bore at the tubular shaft 4, so that shaft 10 is supported not-rotatably relative to tubular shaft 4 and is supported to the reel body 1 in relation of being rotatable through the pinion 3 and slidable longitudinally of reel body 1.

Also, the spool shaft 10 is adapted to be subjected to a resistance against its rotation by a drag mechanism to be discussed below.

The drag mechanism constitutes a resistance mechanism of the invention, which comprises grooves 5a provided at the inner periphery of the support cylinder 5 and extending axially thereof; first drag washers 11 having projections to be fitted into the grooves 5a and made not-rotable relative to support cylinder 5; second drag washers 12 having projections to be fitted into grooves 4a at the tubular shaft 4 and being rotatable integrally with the tubular shaft 4, and in turn with the spool shaft 10; and a drag thumb nut 14 having a spring 13 for biasing the drag washers 11 and 12 toward the rear wall of reel body 1.

The drag thumb nut 14 screws with a screw thread at the inner peripheral surface of support cylinder 5, thereby enabling adjustment of the rotation resistance to be given to the spool shaft 10 through the drag washers 11 and 12. Also, the drag thumb nut 14 is screwably tightened to enable interruption of the rotation of spool shaft 10.

Next, explanation will be given on a shock absorber 20 of the principal portion of the invention.

In the first embodiment shown in FIGS. 1 and 2, the spool shaft 10 is supported rotatably with respect to the reel body 1 and given a rotational resistance by the drag mechanism. Spool 9 is supported rotatably to the spool shaft 10, with the shock absorber 20 being interposed between the spool 9 and the spool shaft 10.

In greater detail, the spool shaft 10 has a spool support means comprising a front support 31 and a rear support 32 for supporting the spool 9 at the front and rear portions of trunk 9a, the support means supporting the spool 9 to the spool shaft 10 in relation of being rotatable and not-movable axially thereof.

In addition, the front support 31 is fitted onto the not-round portion 10b and fixed to the spool shaft 10 by a thumb nut 33 screwable with the screw thread 10a, the rear support 32 being fixed to the spool shaft 10 by a pin 34 perforating therethrough, and the trunk 9a having a flange 9d projecting radially inwardly of the same.

The shock absorber 20 mainly uses a coil spring having a pair of retaining ends 21 and 22, which is contained in a space between the supports 31 and 32 and the central portion of trunk 9a. Retaining end 21 is retained to the inner flange 9d at the spool 9, and retaining end 22 to the rear support 32.

Also, between the spool 9 and the rear support 32 is provided a regulation means 40 for regulating a rotation range of spool 9 with respect to the spool shaft 10.

The regulation means 40, as shown in FIG. 2, comprises a projection 41 projecting radially outwardly from the outer periphery at the rear side of rear support 32. Regulation means 40 also includes an annular groove 42 located at the inner periphery at the rear side of trunk 9a of spool 9. Annular groove 42 receives therein the projection 41, and a projection 43 projecting radially inwardly from the bottom of annular groove 42 and interfering with the projection 41. The spool 9 is rotatable only at a rotary angle of 360° with respect to the spool shaft 10 and becomes integral therewith through the interference of projection 43 with that 41.

This regulation means 40 is not indispensable, but serves to give a preload to the coil spring of shock absorber 20, thereby enabling the spool 9 to be supported to the spool shaft 10 without a play.

In addition, in FIG. 1, reference numeral 15 designates an anti-reverse-rotation gear to prevent the reverse rotation of rotary frame 8, which is fixed to the tubular portion 3a at the pinion 3, and reference numeral 17 designates an anti-reverse-rotation pawl operated by a changeover lever 16 to swing between the positions of engaging with the gear 15 and disengaging therefrom. Reference numeral 18 designates a reciprocation mechanism for allowing the spool shaft to associate with the master gear 7 and be slidable longitudinally of reel body 1, and reference numeral 19 designates a lock gear which engages with a lock pawl (not shown) operated by a changeover lever (not shown) to lock the spool shaft 10 not to rotate reversely by the pulled line. A lock mechanism comprising the lock gear 19 and lock pawl is included in the resistance means of the invention, which is of course applicable to a spinning reel using not the drag mechanism but only the lock mechanism.

The first embodiment of the spinning reel of the invention uses the drag thumb nut 14 to apply to the spool shaft 10 a rotational resistance corresponding to the durability of the line wound onto the spool 9, but even if an excessive rotational resistance is applied by mistake, intentionally, or by the lock mechanism operated to lock the spool shaft 10, the shock absorber 20 of the invention functions to prevent the line from being cut.

Now, the handle is operated to drive the handle shaft 6 and rotate the rotary frame 8 through the master gear 7 and pinion 3, whereby the line is guided by the arm roller at the bail arm and wound onto the spool 9 uniformly through the reciprocation mechanism.

In a case where the rotary frame 8 rotates to wind the line onto the spool 9, or the line is subjected to a pulling force by a hooked fish even in the stationary condition of rotary frame 8 and an excessive pulling force overcoming the durability of the line acts thereon, if the resistance set by the drag mechanism is less than the durability of the line, the washers 11 and 12 slide therebetween to rotate the spool shaft 10, whereby no load overcoming the durability of the line is applied thereon. However, when a resistance in excess of the pulling force threshold of the line is applied to the spool shaft 10, the line may lead to a cut in the conventional case.

The first embodiment, however, has the spool 9 rotatable with respect to the spool shaft 10 and the shock absorber 20 is interposed therebetween, so that the pulling force of the line is lessened and the impact thereon is absorbed, thereby enabling the prevention of a careless cut at the line.

Also, in the first embodiment, a washer 23 is interposed between the front support 31 and the inner flange 9d at the spool 9, and the thumb nut 33 is tightened to bias the washer 23 toward the flange 9d, thereby enabling the spool 9 to be integral with the spool shaft 10. Such construction can optionally select the use of shock absorber 20 to allow the angler to enjoy fishing by choice without using the shock absorber 20.

Figure 3:
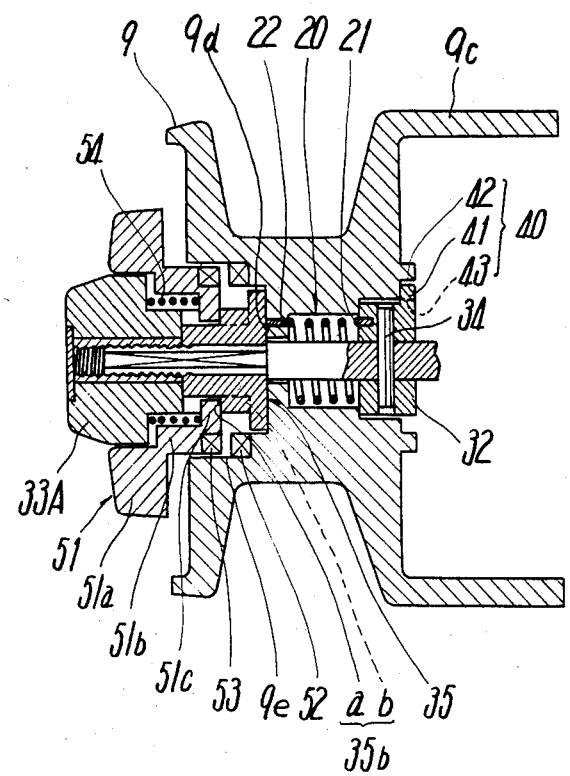
FIG. 3 is a sectional view of the principal portion of a second embodiment of the invention.
Figure 4:
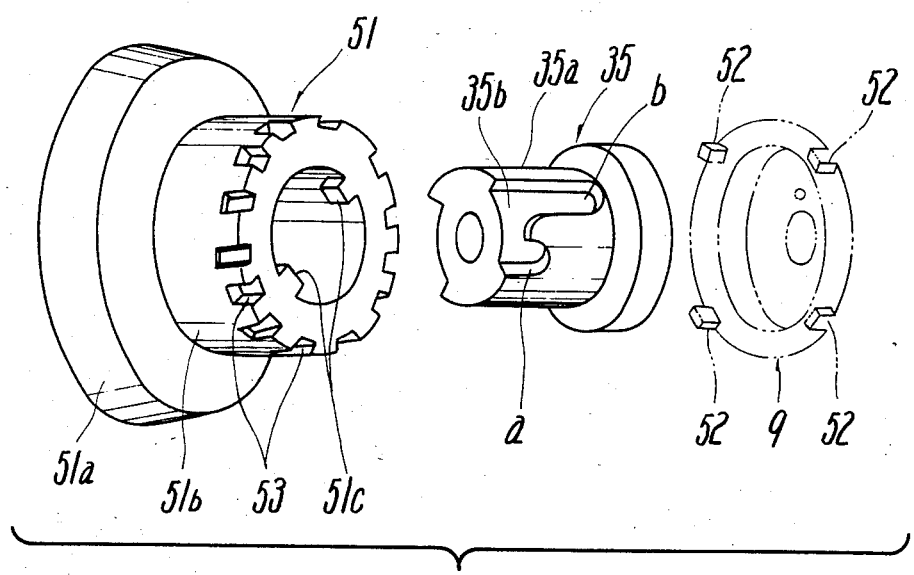
FIG. 4 is a perspective exploded view of the principal portion of the second embodiment.

The aforesaid construction is modifiable as shown in FIGS. 3 and 4.

In FIGS. 3 and 4, between the spool 9 and the spool shaft 10 at the first embodiment is provided a connecting or disconnecting means which can connect or disconnect them by use of thumb nut 33A. In other words, a changeover member 51 is provided between the front support 31 and the thumb nut 33A in the first embodiment, and engaging teeth 52 and 53 are provided between the changeover member 51 and the trunk 9a of spool 9.

In greater detail, a front support 35, as shown in FIG. 4, has a tubular portion 35a, on the outer periphery of which are formed a pair of cam grooves 35b comprising first engaging portions a extending axially of tubular portion 35a and smaller in length and second engaging portions b extending similarly and larger in length. Front support 35 includes a bore for receiving non-round portion 10b of shaft 10. At the trunk 9a of spool 9 is provided a space 9e larger in diameter than the inner surface of trunk 9a abutting against the front support 35, and at the inner end of space 9e are provided a plurality of engaging teeth 52. The changeover member 51 is composed of a control 51a and a tubular portion 51b to be fitted into the space 9e, the control 51a being supported rotatably and axially movably to a thumb nut 33A. Tubular portion 51b is provided at the fore end of is inner periphery with a pair of engageable projections 51c projecting radially inwardly and fitted to the cam grooves 35b, and at the fore end of is outer periphery with a plurality of teeth 53 engageable with the teeth 52. Between projections 51c and the thumb nut 33A is provided a spring 54 to bias the changeover member 51 toward the spool 9.

Now, the changeover member 51 is operated to engage the projections 51c with the first engaging portions a at the cam grooves 35b to thereby disconnect the engaging teeth 52 and 53 from each other as shown in FIG. 3 respectively. Hence, the spool 9 is rotatable with respect to the spool shaft 10 and rotates to actuate the shock absorber 20.

The changeover member 51 is operated to engage the projections 51c with the second engaging portions b at the cam grooves 35b and moves toward the spool 9 by virtue of the spring 54 and the engageable teeth 52 and 53 engage integrally with each other, thereby making the shock absorber 20 not-operable.

Alternatively, the shock absorbers 20 in the above embodiments may be interposed between the spool 9 and the front support 31 or spool shaft 10.

Also, the spool 9 may alternatively be fixed to the spool shaft 10 and the second drag washers 12 may be supported rotatably with respect to the tubular shaft 4 so that the shock absorber 20 may be interposed between the second drag washers 12 and the tubular shaft 4 rotatable integrally with the spool shaft 10.

In any case, the shock absorber 20 need only be interposed between the spool 9 or the member rotating together therewith and the member subjected to a resistance from the resistance means, such as the drag mechanism or lock mechanism.

Alternatively, the shock absorber 20 may use a spiral spring or an elastic material, such as rubber.

As seen from the above, this invention provides a shock absorber so that even when an excessive pulling force to the line is abruptly applied to the spool, the spool rotates and an impact is absorbed by the shock absorber, thereby preventing a cut at the line.

Although the invention has been described with reference to different embodiments, these embodiments are merely exemplary and not limiting of the invention, which is defined solely by the appended claims.

What is claimed is:

1. A spinning reel, comprising a reel body, a spool, said spool being rotatably supported with respect to said reel body, a rotary frame rotatably supported to said reel body, for winding a fishing line onto said spool during rotation of said rotary frame relative to said reel body, a first member rotatably mounted relative to said reel body, coupling means for coupling said first member and said spool to each other such that said spool is rotatable relative to said first member for at least a partial revolution relative thereto, resistance means for applying a rotational resistance to said first member and to said spool against rotation of said first member and said spool relative to said reel body to enable interruption of rotation of said spool relative to said reel body, and elastic shock absorber means disposed between said spool and said first member to absorb a shock caused by an excessive pull action on said line greater than a predetermined durability of said line in a condition in which an excessive resistance greater than the predetermined durability of said line is applied by said resistance means against rotation of said spool, wherein said coupling means includes regulation means for stopping relative rotation between said first member and said spool at an end of said at least a partial revolution to cause said first member and said spool shaft to be rotatable with each other to regulate a range of rotation of said spool with respect to said first member.

2. A spinning reel, comprising a reel body, a spool, said spool being rotatably supported with respect to said reel body, a rotary frame rotatably supported to said reel body, for winding a fishing line onto said spool during rotation of said rotary frame relative to said reel body, a first member rotatably mounted relative to said reel body, coupling means for coupling said first member and said spool to each other such that said spool is rotatable relative to said first member for at least a partial revolution relative thereto, resistance means for applying a rotational resistance to said first member and to said spool against rotation of said first member and said spool relative to said reel body to enable interruption of rotation of said spool relative to said reel body, elastic shock absorber means disposed between said spool and said first member to absorb a shock caused by an excessive pull action on said line greater than a predetermined durability of said line in a condition in which an excessive resistance greater than the predetermined durability of said line is applied by said resistance means against rotation of said spool, and a changeover means for selectively enabling and stopping operation of said elastic shock absorber means and said coupling means by alternately causing said spool and said first member to connect with each other and rotate integrally with each other and to disconnect from each other to enable relative movement with respect to each other.

3. A spinning reel according to claim 2, wherein said coupling means includes regulation means for stopping relative rotation between said first member and said spool at an end of said at least a partial revolution to cause said first member and said spool shaft to be rotatable with each other to regulate a range of rotation of said spool with respect to said first member.

4. A spinning reel according to claim 2, wherein said first member comprises a spool shaft for supporting said spool rotatably with respect to said reel body, said spool shaft passing through said reel body and being disposed longitudinally thereof, said spool shaft including support means which includes front and rear support members and which supports said spool rotatably and substantially non-axially movable relative to said spool shaft.

5. A spinning reel according to claim 4, wherein said rear support member is fixed to said spool shaft and said front support member includes a thumb nut screwable with said spool shaft and fixed to said spool shaft by screwing said thumb nut with said spool shaft, said shock absorber means being interposed between said spool and one of said support members.

6. A spinning reel according to claim 5, wherein said regulation means is disposed between said rear support member and said spool.

* * * * *